(12) United States Patent
Takagi et al.

(10) Patent No.: US 8,045,265 B2
(45) Date of Patent: Oct. 25, 2011

(54) THREE-DIMENSIONAL IMAGE RECORDING MEDIUM

(75) Inventors: Yasuhiro Takagi, Tokyo (JP); Hideki Yamazaki, Tokyo (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 13/074,879

(22) Filed: Mar. 29, 2011

(65) Prior Publication Data

US 2011/0176210 A1    Jul. 21, 2011

Related U.S. Application Data

(62) Division of application No. 11/562,474, filed on Nov. 22, 2006, now Pat. No. 7,940,456.

(30) Foreign Application Priority Data

Nov. 24, 2005 (JP) ................................. 2005-338771

(51) Int. Cl.
*G02B 27/22* (2006.01)
(52) U.S. Cl. ............. 359/463; 348/59; 355/22; 396/330
(58) Field of Classification Search ........................ None
See application file for complete search history.

(56) References Cited

U.S. PATENT DOCUMENTS

| | | | | |
|---|---|---|---|---|
| 5,349,419 A | * | 9/1994 | Taguchi et al. | 355/22 |
| 5,850,580 A | * | 12/1998 | Taguchi et al. | 396/330 |
| 2005/0083400 A1 | * | 4/2005 | Hirayama et al. | 348/14.07 |
| 2006/0033732 A1 | * | 2/2006 | Fukushima et al. | 345/419 |
| 2006/0132916 A1 | * | 6/2006 | Oikawa et al. | 359/463 |

* cited by examiner

*Primary Examiner* — Lee Fineman
(74) *Attorney, Agent, or Firm* — Ostrolenk Faber LLP

(57) ABSTRACT

An object of the present invention is to provide a three-dimensional image recording medium in which three-dimensional information of a recorded material is recorded precisely and observed more naturally. The linear images of plural parallel-projection images from different directions A to E divided into rectangles are recorded sequentially to divisional recording units of the linear image recording units M1 to M8 and in addition, the linear images of divided parallel-projection images from the same direction are recorded sequentially to each divisional recording unit arranged in the same position relative to a lens width direction of each lenticular lens unit L1 to L8 corresponding to each linear image recording unit M1 to M8 to thereby reproduce a three-dimensional image by combining the linear images of plural parallel-projection images.

1 Claim, 10 Drawing Sheets

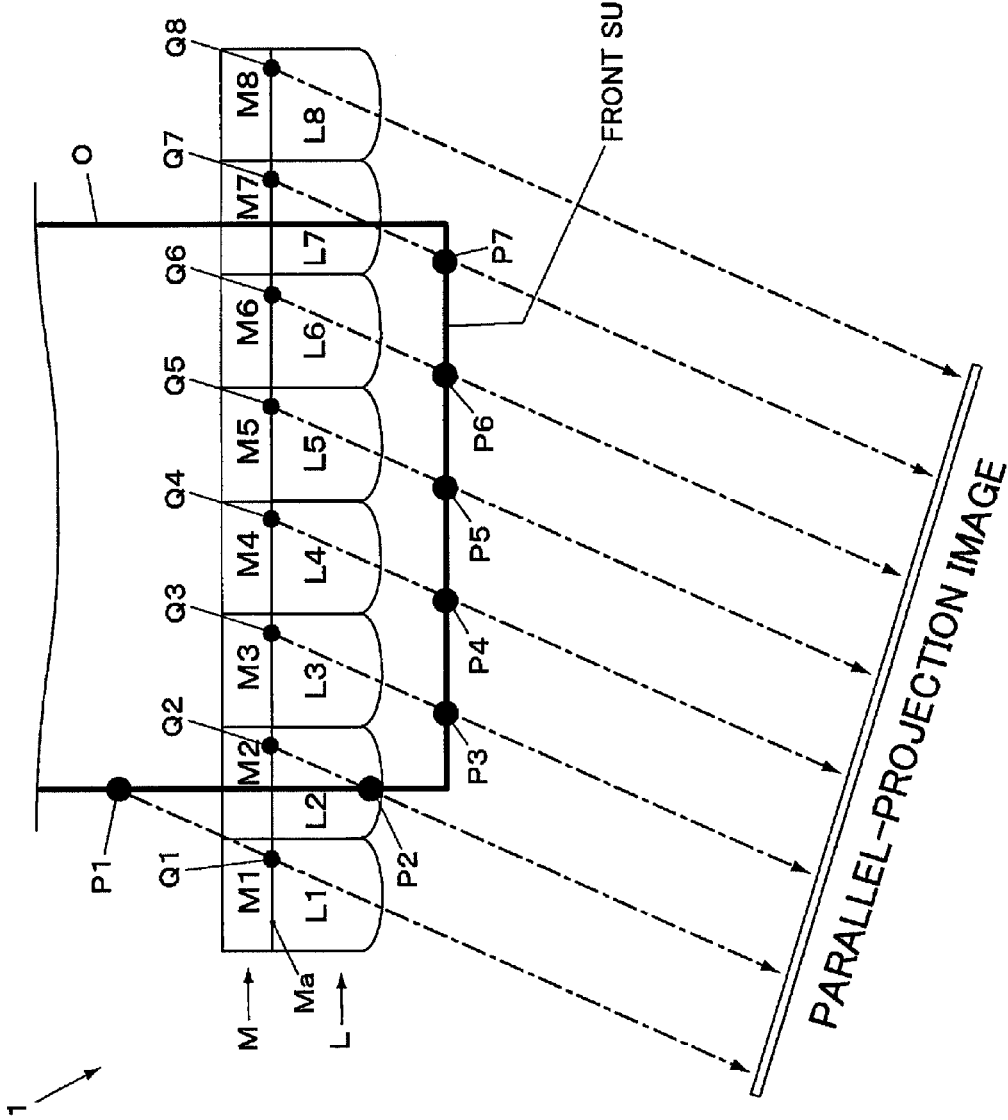
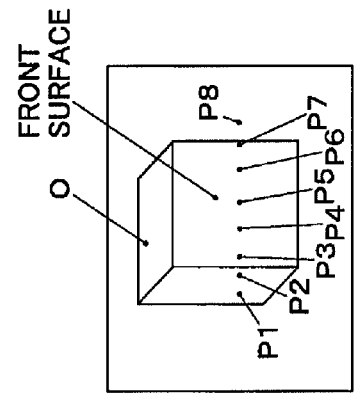
FIG. 1A
FIG. 1B

DIRECTION A  DIRECTION B  DIRECTION C  DIRECTION D  DIRECTION E

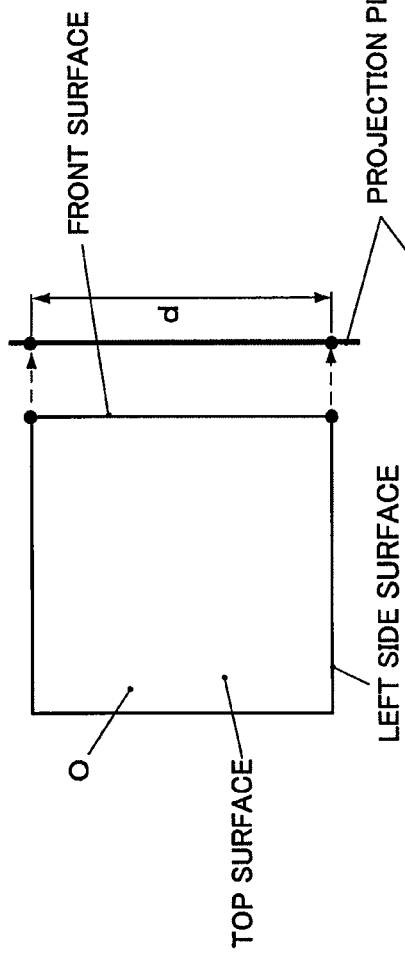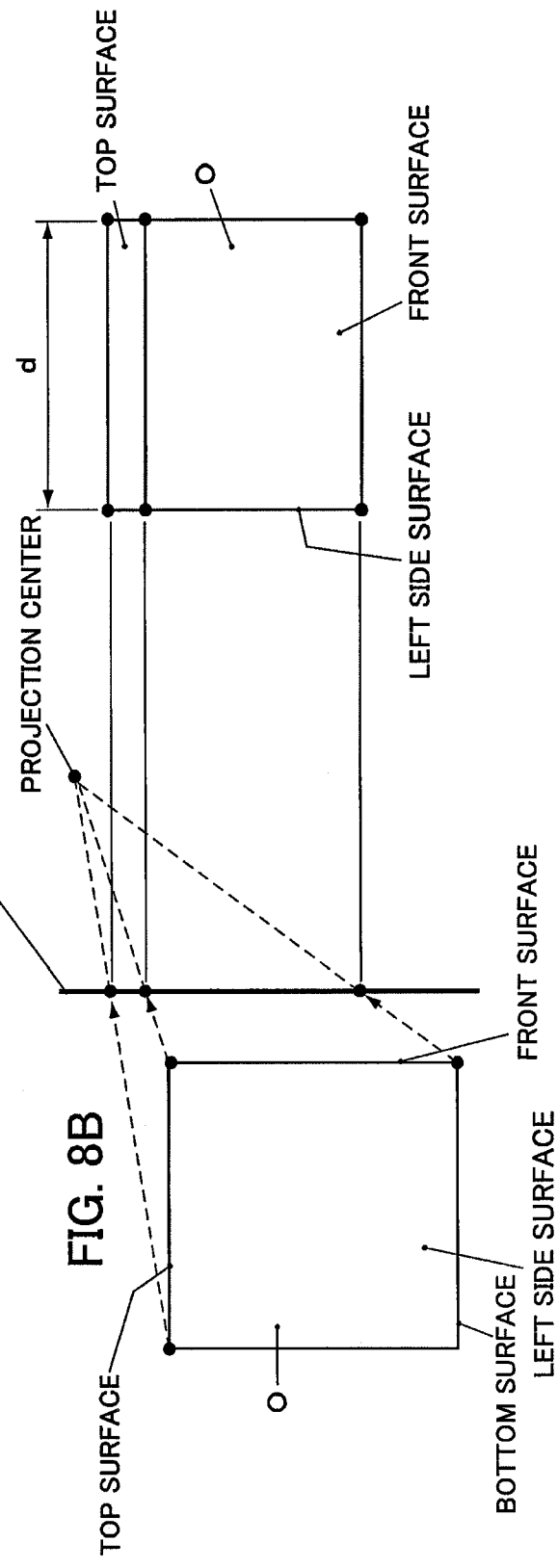

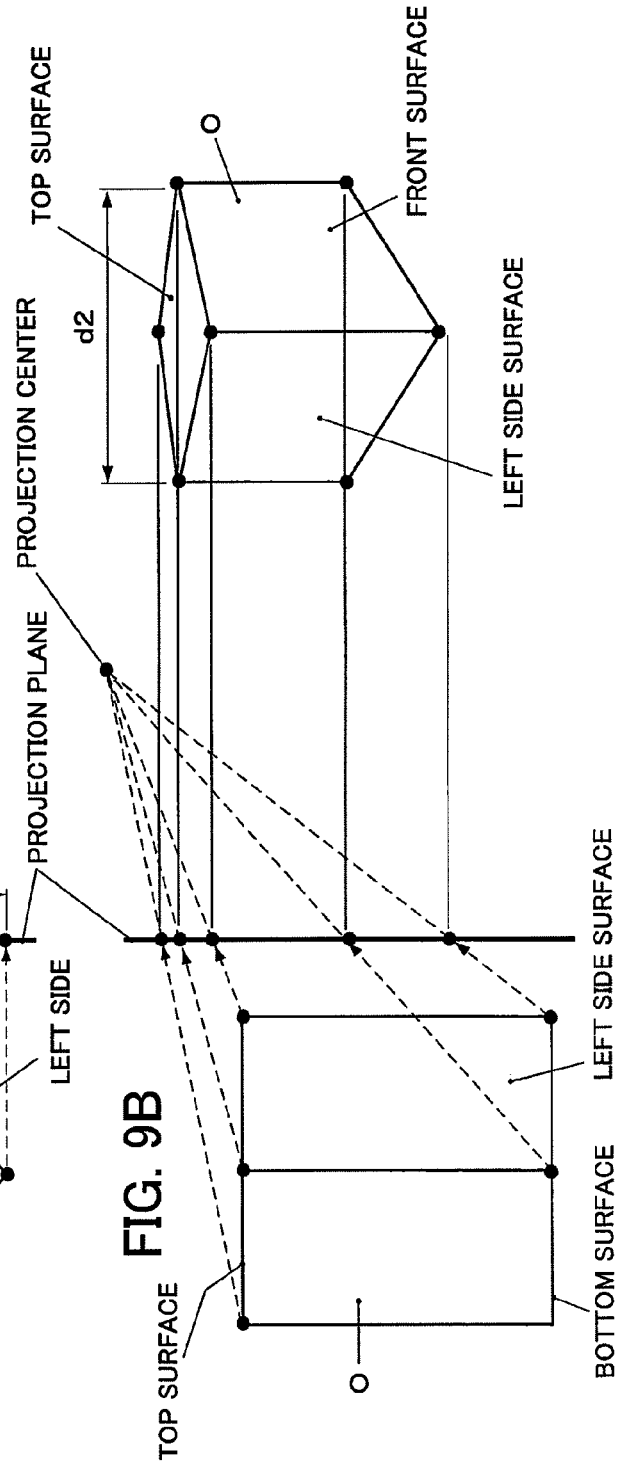

THREE-DIMENSIONAL IMAGE RECORDING MEDIUM

This application is a divisional of U.S. patent application Ser. No. 11/562,474 filed Nov. 22, 2006, which also is based on and claims the benefit of priority from Japanese Patent Application No. 2005-338771, filed on 24 Nov. 2005, the content of which is incorporated herein by reference.

BACKGROUND OF THE INVENTION

1. Field of the Invention

The present invention relates to three-dimensional image recording media using lenticular sheet.

2. Related Art

Three-dimensional printed materials for stereoscopic views, which consist of lenticular lenses and linear images of printed parallax images disposed below the lenticular lenses, have been known in the art.

The width and position of the lenticular lenses and those of the printed surfaces of conventional three-dimensional printing materials coincide with each other as shown in FIG. 10. This is favorable for lenses that provide frontal views; however, there have been problems of image overlap and flicker for lenses that provide views from some angles such as the edges of the three-dimensional printed materials because parallax images of adjacent lenses are also visible.

Also, three-dimensional forms are not recorded precisely on printed surfaces of conventional three-dimensional printed materials because they are based on the idea that images (perspective projection images) taken by common cameras are used as parallax images to show the images actually taken by the camera.

A method for recording three-dimensional images and a three-dimensional image recording apparatus are disclosed in Japanese Unexamined Patent Application Publication No. 5-289208 in which the recording positions of the linear images, where all linear images of an "n"th original image recorded corresponding to each lenticular lens fall within the same area at a predetermined viewing position, are calculated with respect to each lenticular lens for all linear images of the "n"th original image, and the recording positions of the linear images in the image forming units are determined based on the above calculation result. It is possible for this kind of three-dimensional image recording apparatus to prevent parallax images from being visible through adjacent lenses even at the edges of the three-dimensional printed materials.

However, the above apparatus may still have a problem wherein the adjacent linear images may still be unintentionally visible because of some misalignments of the recording positions and viewing positions (observing positions). Moreover, the three-dimensional image recording apparatus is also based on the idea that photographed images are shown as similar to conventional apparatuses, and recorded materials are not reproduced precisely and the images may give discomfort to viewers because unwanted linear images are also visible. Furthermore, the above three-dimensional recording apparatus also has a problem in that the calculation of the recording positions of linear images requires extra effort.

SUMMARY OF THE INVENTION

Accordingly, an object of the present invention is to provide a three-dimensional image recording medium in which three-dimensional information of a recorded material is recorded precisely to show an image more naturally.

The following constitutions are provided to solve the above-mentioned problems.

The first aspect of the present invention contains lenticular sheets (L and 2L) in which plural lenticular lens units (L0 to L9) are arranged, and linear image recording media (M and 2M) in which plural linear image recording units (M1 to M8 and 2M0 to 2M9), each are disposed on the back side of the above lenticular lens units (L0 to L9). The linear image recording units (M1 to M8 and 2M0 to 2M9) have divisional recording units disposed by dividing the recording units. The linear images (A1 to E1, etc.) of the directional images divided into rectangles, which are either plural parallel-projection images from different directions or two-dimensional images parallel-projected to a predefined direction, are recorded sequentially in the divisional recording units. The linear images (A1 to A8, etc.) of the divided parallel-projection images or divided directional images from the same direction are recorded sequentially to each divisional recording unit (M1 to M8 and 2M0 to 2M9) arranged in the same position relative to the lens width direction of each lenticular lens unit corresponding to each linear image recording unit of the linear image recording media (M and 2M). The three-dimensional image recording medium is characterized by being able to provide a three-dimensional image by combining linear images of plural parallel-projection images or directional images at the viewing position.

In the second aspect of the present invention, the three-dimensional image recording medium is characterized by linear image recording units (M1 to M8 and 2M0 to 2M9) in which linear images (A1 to E1, etc.) of divided parallel-projection images or divided directional images with which parallax angles from the front direction are sequentially enlarged from the center to the edges of each corresponding lenticular lens unit (L0 to L9) are recorded sequentially in the three-dimensional image recording medium described in the first aspect of the present invention.

In the third aspect of the present invention, the three-dimensional image recording medium is characterized by linear image recording media (M and 2M) in which the linear images (A1 to A8, etc.) of the parallel-projection images or the directional images from the same direction divided respectively from the center to the edges thereof are recorded sequentially to each divisional recording unit arranged in the same position relative to a lens width direction of each lenticular lens unit (L0 to L9) corresponding to each linear image recording unit (M1 to M8 and 2M0 to 2M9) from the center to the edges of the linear image recording media (M and 2M) in the three-dimensional image recording medium described in the second aspect of the present invention.

In the fourth aspect of the present invention, the three-dimensional image recording medium is characterized by linear image recording units (2M0 to 2M9) disposed in an observing and recording area (D2, etc.) where a light beam moving through the lenticular lens units (L0 to L9) toward the observing position accords with the area of the observing position, and the linear images (Z1, Y1 and X1, etc.), that are either divided parallel-projection images or directional images with larger parallax angles, are recorded sequentially to the divisional recording units of an area where observing and recording area (D2, etc.) and the recording area within a lens width of the lenticular lens units (2M0, etc.) placed next to the linear image recording units overlap with each other in the three-dimensional image recording medium described in the third aspect of the present invention.

In the fifth aspect of the present invention, the three-dimensional image recording medium is characterized by linear image recording units (M1 to M8 and 2M0 to 2M9) disposed within an area where straight lines drawn between the observing position and both edges of the lenticular lens units (L0 to L9) intersect with the linear image recording medium (2M) in the three-dimensional image recording medium described in the third or fourth aspects of the present invention.

In accordance with the present invention, the following advantages are offered.

(1) Because linear images of the parallel-projection images or directional images of a recorded material are recorded in the linear image recording medium, three-dimensional information of the recorded material can be printed more precisely and in addition, three-dimensional images can be obtained by combining linear images of plural parallel-projection images or directional images, enabling the recorded material to be reproduced more truly and naturally.

(2) In the present invention, the linear images of divided parallel-projection images or directional images with which parallax angles from the front direction are sequentially enlarged from the center to the edges of each lenticular lens unit corresponding to the linear image recording units are recorded sequentially. More specifically, instead of a positional relationship between the lenticular lens units and the observing position, the linear images from the front direction are recorded at the center of the lenticular lens units of the linear image recording units, and the linear images with which parallax angles are sequentially enlarged toward the edges of the lens are recorded. This enables the three-dimensional information from each direction of the recorded material to be recorded without complicated calculations.

(3) In the present invention, the linear images of the parallel-projection images or directional images from the same direction divided respectively from the center to the edges thereof are recorded sequentially at each divisional recording unit arranged in the same position relative to the lens width direction of each lenticular lens unit corresponding to each linear image recording unit from the center to the edges of the linear image recording media. This allows the three-dimensional information of the recorded material from the above direction (the same direction) to be divided and recorded to each linear image recording unit.

(4) In the present invention, the linear image recording units are disposed in an area within the lens width of the lenticular lens units arranged next to the linear image recording units, and the linear images that are either divided parallel-projection images or directional images with larger parallax angles, are recorded sequentially in the above area. This enables the recorded materials to be reproduced more naturally because image flicker, etc. are prevented even when the recording units on the back side of the lenticular lens units next to each linear image recording unit are also observed from the observing position because linear images with larger parallax angles are recorded.

(5) In the present invention, because the linear image recording units are disposed within an area where straight lines drawn between the observing position and both edges of the lenticular lens units intersect with the linear image recording medium (2M), the linear image recording units placed on the edges of the sheet can also give true light beam information, for example.

BRIEF DESCRIPTION OF THE DRAWINGS

FIGS. 1A and 1B are view describing Example 1 of the three-dimensional printed material according to the present invention;

FIGS. 8A, 8B, and 8C are view showing the directional image of Example 3 according to the present invention;

FIGS. 9A, 9B, and 9C are view showing the directional image of Example 3; and

DETAILED DESCRIPTION OF THE INVENTION

An object of the present invention, which is to provide a three-dimensional image recording medium in which three-dimensional information of a recorded material is recorded precisely to show an image more naturally, is accomplished by recording linear images that are plural parallel-projection images from different directions divided into rectangles onto the divisional recording units of the linear image recording units sequentially, and further recording linear images that are divided parallel-projection images or divided directional images from the same direction to each divisional recording unit arranged in the same position relative to a lens width direction of each lenticular lens unit corresponding to each linear image recording unit sequentially, and then creating a three-dimensional image by combining the linear images of plural parallel-projection images.

Example 1

A three-dimensional printed material (three-dimensional image recording medium) of the present invention will be further described in detail by way of Example 1, referring to the following figures, etc.

First, the properties of a three-dimensional printed material 1 of the Example 1 will be described.

Figure 2:
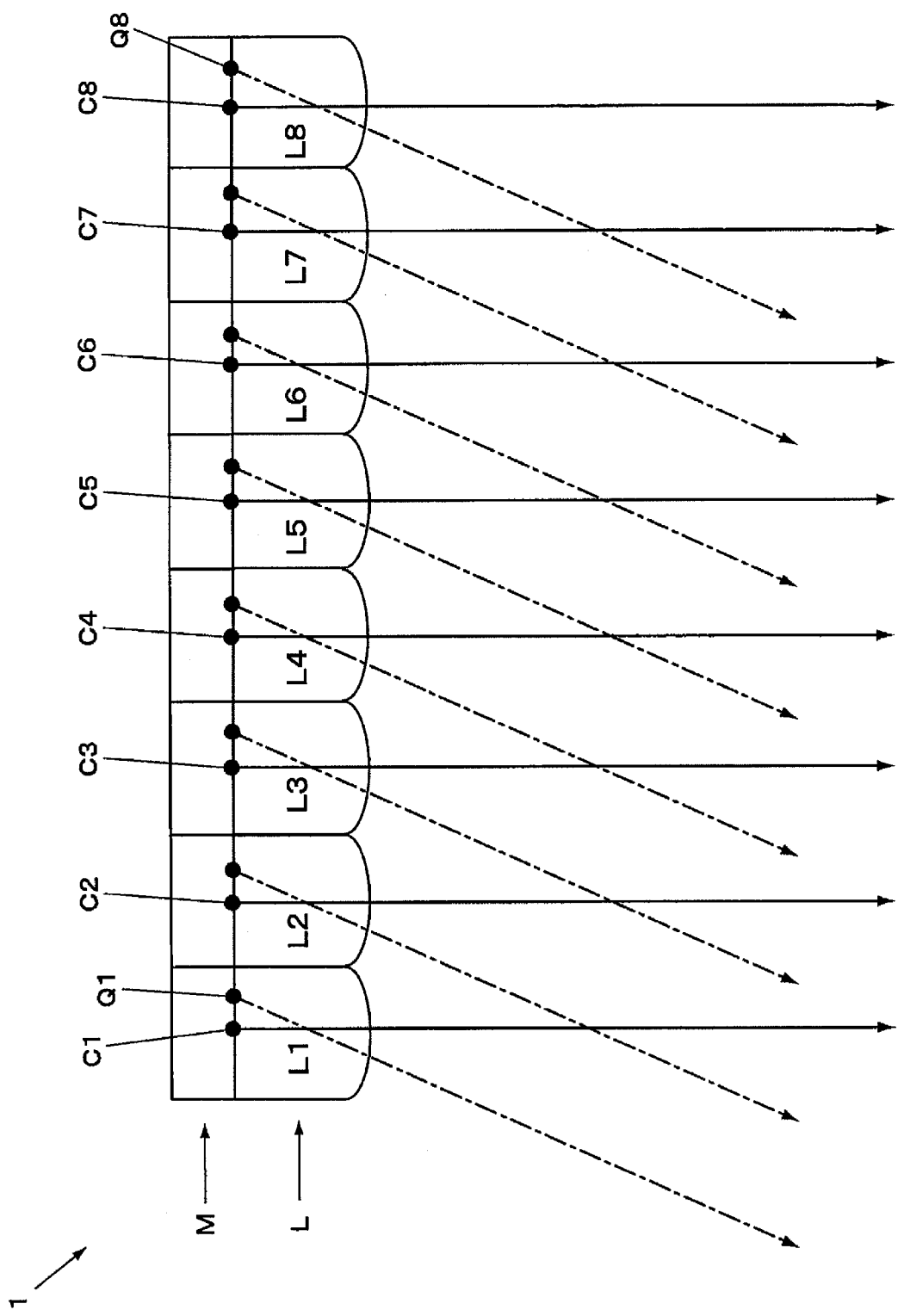
FIG. 2 shows a cross section of the three-dimensional printed material of Example 1.

FIGS. 1A, 1B and 2 are views describing the three-dimensional printed material 1 of the Example 1.

The three-dimensional printed material 1 is equipped with a lenticular sheet L and a linear image recording medium M as shown in FIG. 1A.

Identically shaped plural lenticular lens units L1 to L8 are arranged in the lenticular sheet L.

The linear image recording medium M is disposed on the back side of the entire surface of the lenticular sheet L and linear image recording units M1 to M8 are arranged therein. Light beam information is recorded onto the linear image recording medium M by printing. These linear image recording units M1 to M8 are disposed on the back side of the lenticular lens units L1 to L8 respectively.

The light beam information (three-dimensional information) of the parallel-projection images from obliquely upward left positions P1 to P8 of a cubic recorded material O as shown in FIG. 1B is recorded to the printing positions Q1 to Q8 of each linear image recording unit M1 to M8 that are identically positioned relative to each lenticular lens unit L1 to L8. The traveling directions of all light beams moving from the printing positions Q1 to Q8 of each linear image recording unit M1 to M8 through lenticular lens units L1 to L8 are constant because lenticular lens units L1 to L8 have identical shapes.

Accordingly, three-dimensional information is recorded precisely in each linear image recording unit M1 to M8 by printing the light beam information of parallel-projection images of positions P1 to P8 of the recorded material from the above directions to the printing positions Q1 to Q8 and the three-dimensional information identical to the original material can be reproduced.

Meanwhile, incoming and outgoing light beams through the surfaces of the lenticular lens units L1 to L8 are refracted in practice; however, here they are simplified and expressed as straight lines.

The light beam information of the parallel-projection images from the front direction is recorded to the center positions C1 to C8 of each linear image recording unit M1 to M8 and all light beams moving through the lenticular lens units L1 to L8 progress in the front direction as shown in FIG. 2.

As described above, three-dimensional information of the recorded material O can be recorded precisely in the three-dimensional printed material 1 by recording the light beam information of the parallel-projection images from obliquely upward left and front directions, and the three-dimensional information identical to the original material can be reproduced.

Next, the composition of the three-dimensional printed material 1 will be described in detail.

Figure 3A:
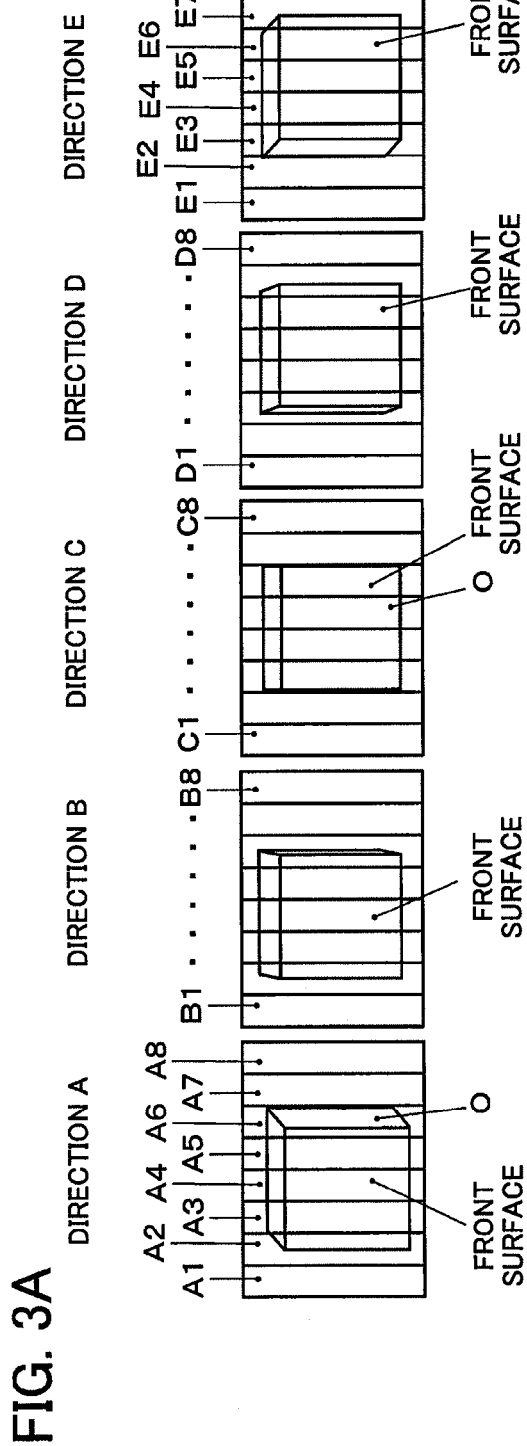
FIGS. 3A and 3B show cross sections of the parallel-projection image of the recorded material and the three-dimensional printed material of Example 1.
Figure 3B:
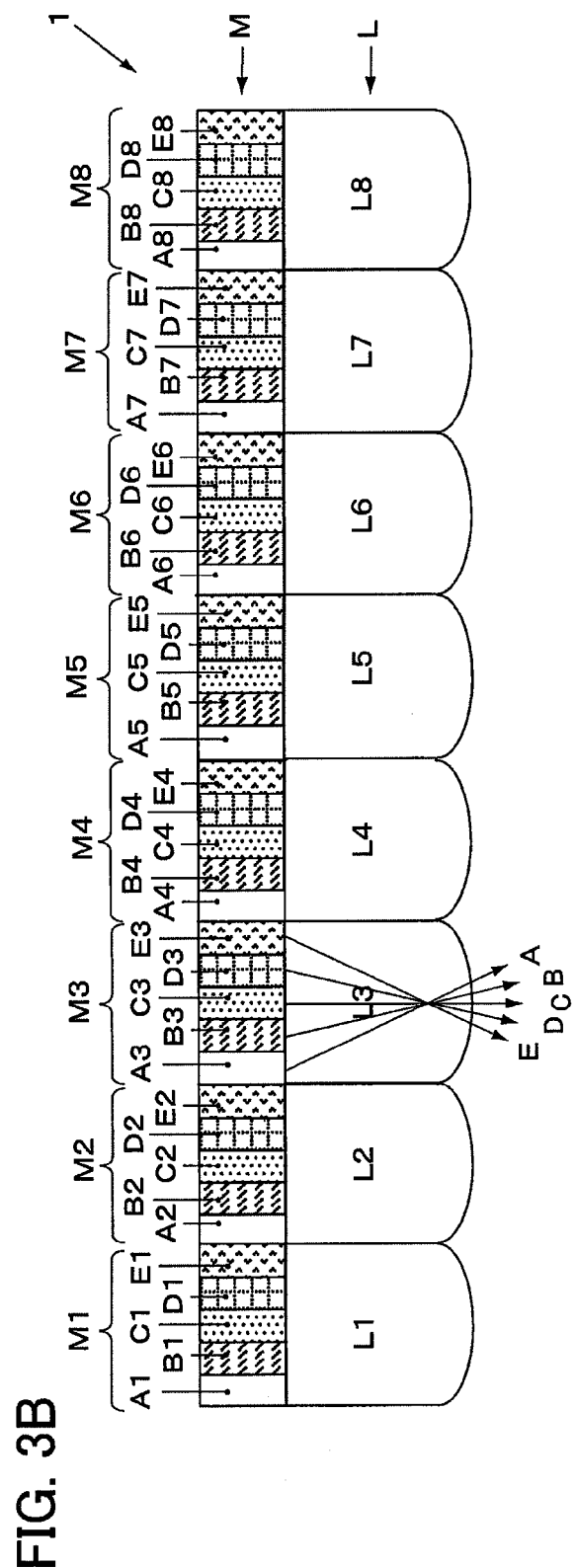

FIG. 3A shows parallel-projection images from five different directions (directions A to E) of the recorded material O, and FIG. 3B shows a cross section of the three-dimensional printed material 1.

The direction C is an upward front direction of the recorded material O, directions B and D are leftward and rightward directions of the direction C, and directions A and E are further leftward and rightward directions of the direction C as shown in FIG. 3B. The parallel-projection images of the directions A to E are divided into eight rectangles, the linear images A1 to A8 through the linear images E1 to E8 respectively.

The linear image recording units M1 to M8 have divisional recording units disposed by dividing each recording unit into five portions as shown in FIG. 3B.

A linear image C1, a divided parallel-projection image from the front direction C is recorded to a divisional recording unit of the linear image recording units M1 in the center of each corresponding lenticular lens L1. The linear images B1 and A1, divided parallel-projection images from the directions B and A, with which parallax angles from the front direction C are enlarged sequentially from the center of the lenticular lens unit L1 corresponding to the linear image recording unit M1 to the divisional recording unit of the left-hand side, are recorded sequentially. Similarly, the linear images D1 and E1, with which parallax angles from the front direction C are enlarged sequentially from the center of the lens to the right-hand side of the lens, are recorded sequentially.

In a similar manner, the linear images A2 to E2 through A8 to E8 are recorded to the divisional recording units of each linear image recording unit M2 to M8 respectively.

The linear images, parallel-projection images from the same direction divided from the center to the edges thereof are recorded sequentially to each divisional recording unit arranged in the same position with respect to the lens width direction of each lenticular lens unit L1 to L8 corresponding to each linear image recording unit M1 to M8 from the center to the edges of the linear image recording medium M by implementing the above recording procedure. More specifically, linear images C4 to C1, parallel-projection images from the front direction C, which is the same direction, divided from the center to the edges thereof are recorded respectively to the divisional recording units in the center (in identical positions) of the linear image recording units M4 to M1, for example. Similarly, linear images A4 to A1 of the parallel-projection image from the direction A where the parallax angle to the leftward is largest, which is divided from the center to the edges thereof, are recorded to each divisional recording unit (identical positions) of the left edge of the lens.

Moreover, light beams emitted from each lenticular lens unit M1 to M8 are converted to light beam information identical to the original material and sent to the observing position. For example, the information recorded in the linear image recording unit M3 is sent as a light beam which moves toward each direction through the lenticular lens unit L3 as shown in FIG. 3B to be reproduced as light beam information having a shape identical to the original material.

Meanwhile, the directions of the parallel-projection images and the numbers of the divisional recording units are simplified and described as five directions and five portions; however, the directions and the numbers are not limited to the above and may be changed suitably according to the size of the lenticular lens units and recorded materials.

Furthermore, the recording units of the lenticular lens units are exemplified as being divided into five portions in Example 1, however, when the recording units are divided into an even number of portions, linear images of parallel-projection images having parallax angles in left and light sides instead of the parallel-projection images from the front direction are recorded to two divisional recording units in the center of the lens.

Figure 4A:
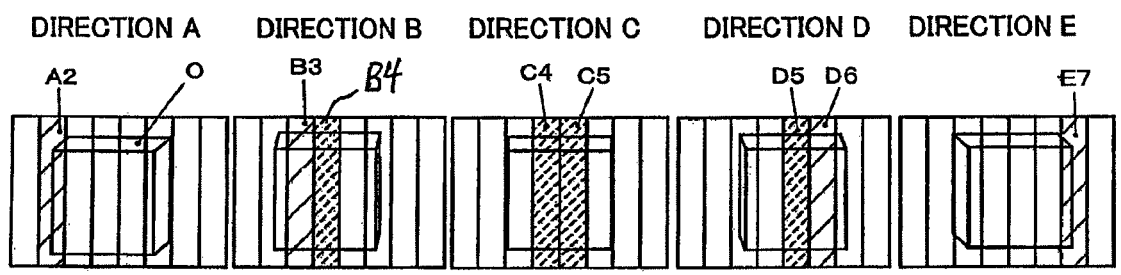
FIGS. 4A, 4B, and 4C are view showing the three-dimensional printed material 1 of Example 1 being observed.
Figure 4B:
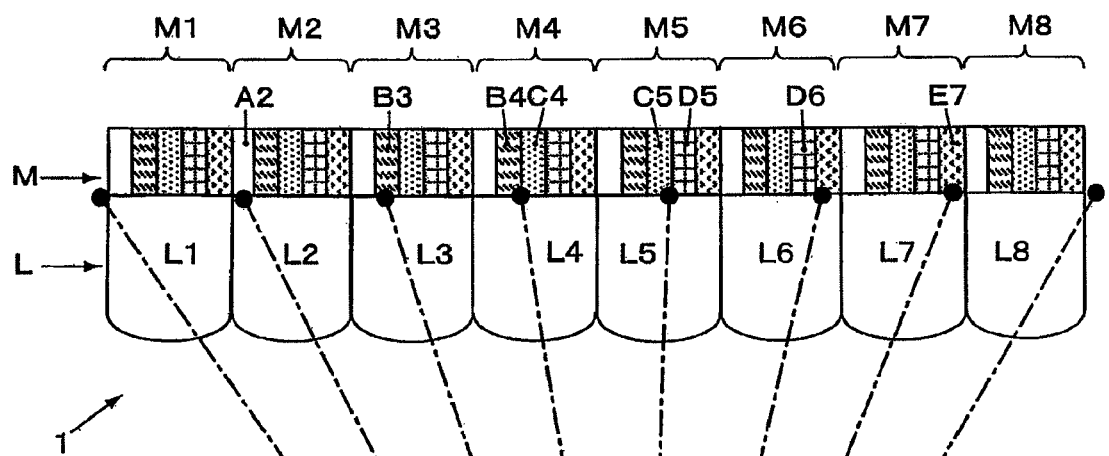
Figure 4C:
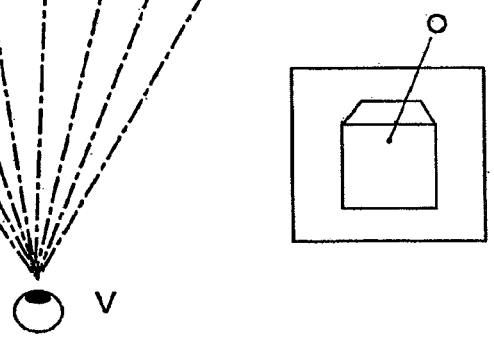

FIGS. 4A, 4B and 4C show the three-dimensional printed material 1 as being observed from an observing position V in the center.

The three-dimensional information of the linear images A2, B3, D6 and E7 of the linear image recording units M2, M3, M6 and M7 are reproduced as light beam information through the light beams moving toward the observing position V through each lenticular lens unit L2, L3, L6 and L7. The information of the linear images B4 or C4 of the linear image recording unit M4, which is the center unit of the linear image recording medium M, is reproduced at the observing position. Similarly, the information of the linear images C5 or D5 of the linear image recording unit M5, which is the center unit of the linear image recording medium M, is reproduced. Moreover, the light beams moving through the lenticular lens units L1 and L8 are not observed at the observing position V because they are from outside of the linear image recording medium M. Meanwhile, "the center unit of the linear image recording medium M" is defined as the center and periphery of the linear image recording medium M.

In the three-dimensional printed material 1 as described above, the linear images of the parallel-projection images of the recorded material O are reproduced as light beam information by means of the lenticular sheet L and the linear image recording medium M, and the light beam information is combined to create a perspective projection image of the recorded material O at the observing position V as shown in FIG. 4C. This is similar to the reproduction of actual light beam information on the three-dimensional printing material 1 by means of the lenticular sheet L and the linear image recording medium M.

In addition, one of the linear images B4 and C4 of the linear image recording unit M4 placed in the center of the linear image recording medium M is observed from the observing position V due to the microscopic difference in the observing positions. Similarly, one of the linear images C5 and D5 of the linear image recording unit M5 placed in the center of the linear image recording medium M is observed. Even in the above cases, the recorded material O can be reproduced more naturally while reducing flicker and blurring because the recorded material O is reproduced by combining the linear images of different parallel-projection images in the three-dimensional printed material 1. In other words, when plural images are divided, recorded and one of the images are combined to be reproduced, and if the image information recorded next to the images being reproduced is observed, the reproduced image may give discomfort to viewers because the information differs from the one intended. However, because the recorded material O is reproduced in the three-dimensional printed material 1 as a perspective-projection image by combining the linear images of the parallel-projection images from different directions, connections between adjacent light beam information are smoothened and image flicker, etc. as described above can be prevented.

As described above, the three-dimensional information of the recorded material O can be recorded more precisely in the three-dimensional printed material 1 of Example 1 because linear image recording units M1 to M8 have divisional recording units disposed by dividing the recording units, and the linear images A1 to E1, etc., which are plural parallel-projection images from different directions A to E divided into rectangles, are recorded sequentially to the divisional recording units. Moreover, the three-dimensional image combined linear images of plural parallel-projection images can be obtained and the recorded material O can be reproduced more truly because the linear images which are divided parallel-projection images from the same direction are recorded sequentially to each divisional recording unit arranged in the same position relative to the lens width directions of each lenticular lens units L1 to L8 corresponding to each linear image recording units M1 to M8 of the linear image recording medium M.

The linear images (B1, A1, D1 and E1, etc.) of the parallel-projection images divided respectively, with which parallax angles from the front direction C are enlarged sequentially from the center to the edges of the lenticular lens units (L1, etc.), are recorded sequentially to the linear image recording units (M1, etc.).

In other words, the three-dimensional information from each direction of the recorded material O can be recorded without complicated calculations because the linear images from the front direction are recorded in the center of each corresponding lenticular lens unit L1 to L8 and the linear images with which parallax angles are enlarged sequentially to the edges of the lens are recorded to each linear image recording unit M1 to M8.

Furthermore, the linear images of the parallel-projection image from the same direction divided from the center to the edges thereof are recorded sequentially to each divisional recording unit disposed on the same position relative to the lens width direction of the lenticular lens units L1 to L8 corresponding to the linear image recording units M1 to M8 from the center to the edges of the linear image recording medium M, thereby enabling the three-dimensional information of the recorded material O from the above direction to be divided and recorded to each linear image recording unit M1 to M8.

Example 2

Example 2 of the three-dimensional printed material (three-dimensional image recording medium) according to the present invention will be described.

A three-dimensional printed material 2 of Example 2 has divisional recording units of each lenticular lens unit that are extended to the back of the lenticular lens unit disposed in the immediate vicinity.

Meanwhile, the parts which function similarly to Example 1 described above are given the same names as in Example 1 and overlapping descriptions are omitted.

First, parallel-projection images and linear images used in Example 2 are described.

Figure 5:
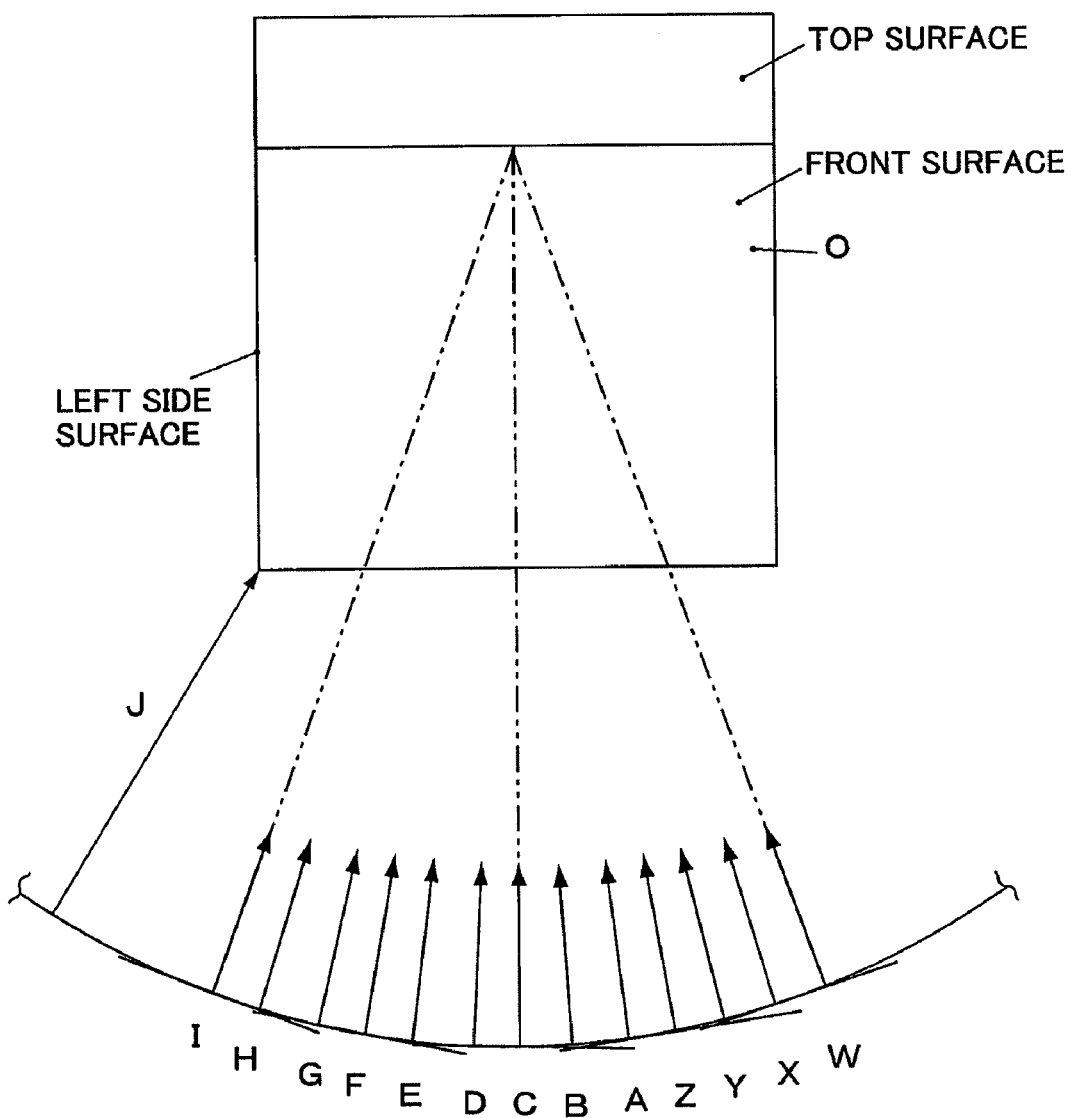
FIG. 5 is a view showing a direction of the parallel-projection image of Example 2 according to the present invention.
Figure 6:
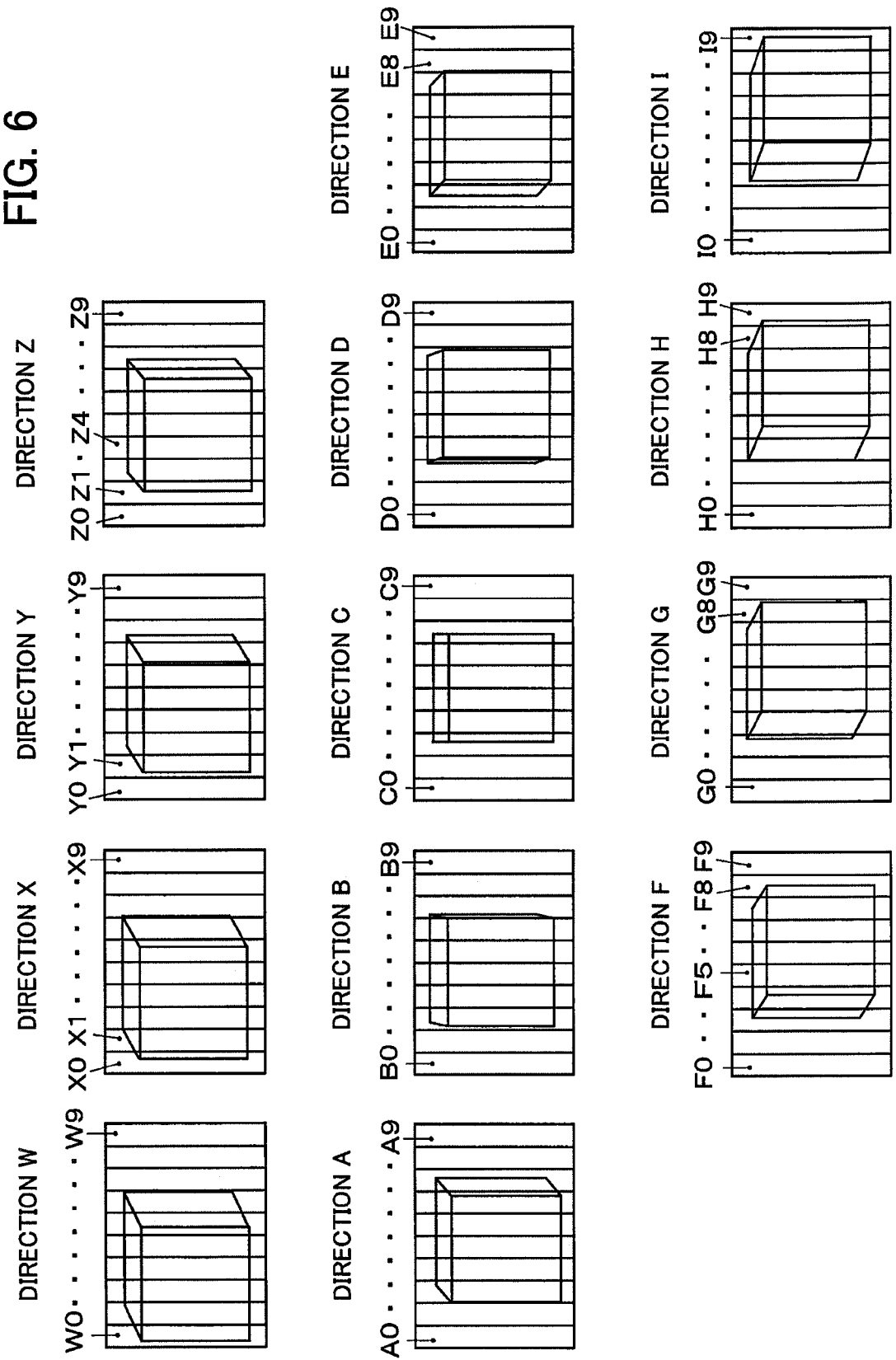
FIG. 6 shows the parallel-projection image of Example 2.

FIG. 5 shows the projection direction of the parallel-projection image of a recorded material O and FIG. 6 shows the produced parallel-projection images.

The images in 13 directions in total are used as the parallel-projection images of the three-dimensional printed material 2 of Example 2 with the addition of eight directions (directions Z to W and F to I) with which parallax angles are larger than other five directions (directions A to E) of Example 1 as shown in FIG. 5. Each parallel-projection image is produced from a position determined by rotating a constant rotating diameter at a constant angle around a predefined position as a center which is obliquely the upper side of the recorded material O. The production methods include a predefined method in which a parallel-projection image is photographed and a method using computer graphics, and the parallel-projection image can be produced more easily by using computer graphics.

The parallel-projection images produced in 13 directions as shown in FIG. 6 are divided by 10 in rectangles respectively to produce linear images W0 to W9 through I0 to I9.

Figure 7:
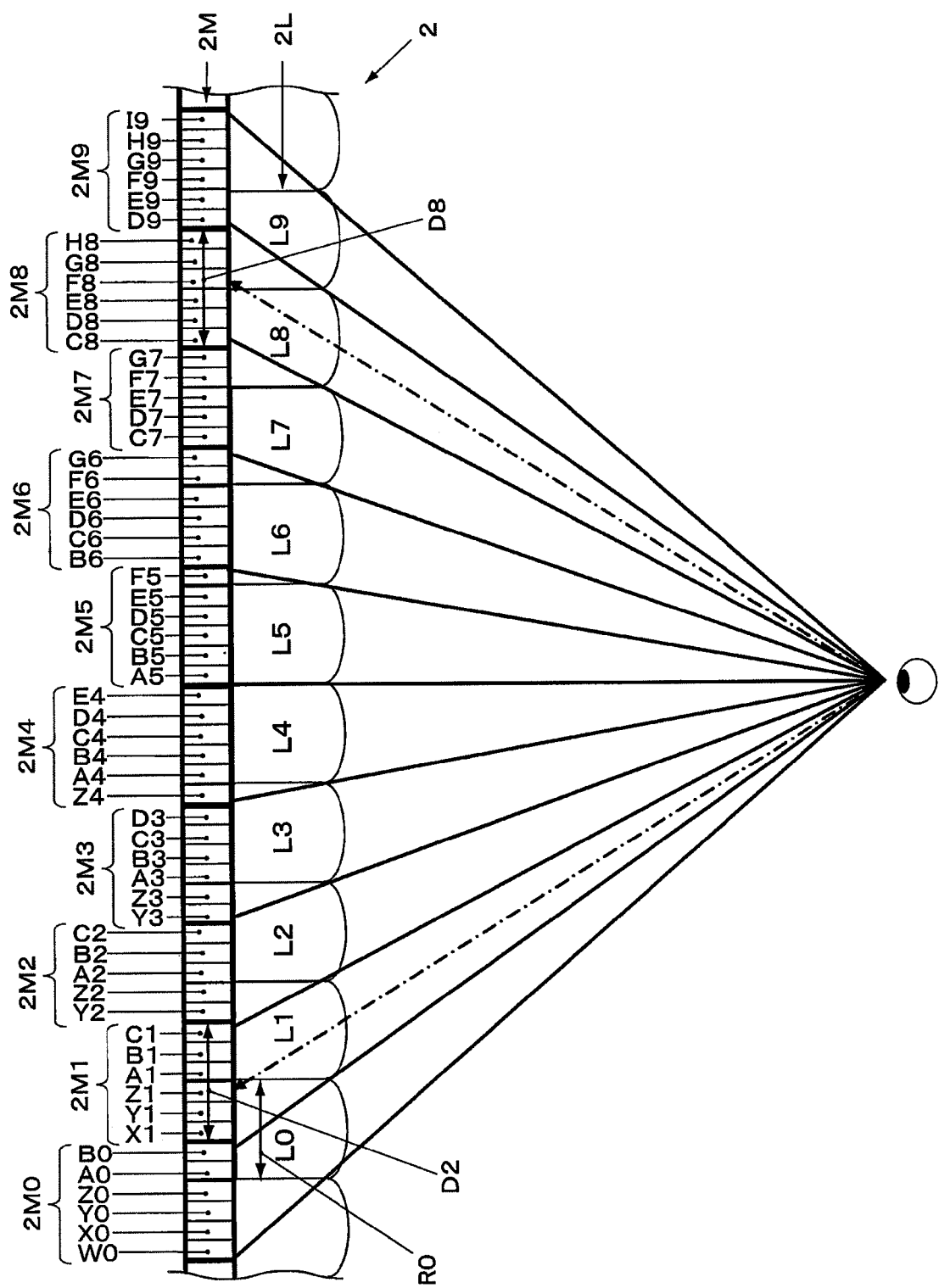
FIG. 7 is a cross section of the three-dimensional printed material of Example 2.
Figure 10:
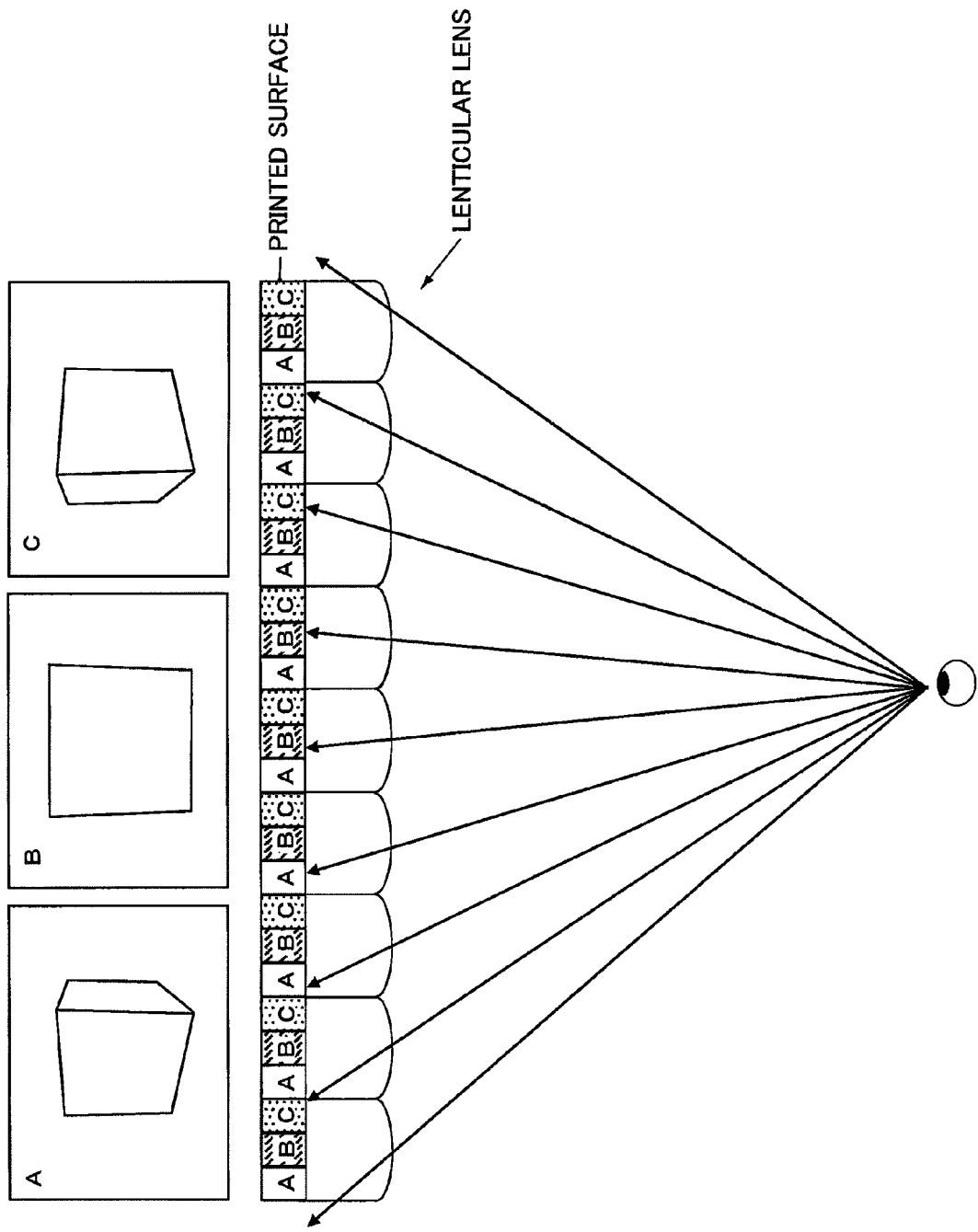
FIG. 10 is a cross section of a conventional three-dimensional printed material.

FIG. 7 shows a cross section of the three-dimensional printed material 2.

Straight lines are extended from the center of a lens sheet 2L, which is an observing position, to both edges of each lenticular lens unit L0 to L9 and the area where the straight lines intersect with the linear image recording medium 2M is determined as a recording unit and in addition, the lower layers of the lenticular lens units in the immediate vicinity are also determined as the recording units of the linear image recording units 2M0 to 2M9 of the three-dimensional printed material 2. In other words, each linear image recording unit 2M0 to 2M9 is disposed in the recording unit (observing and recording area) in which light beams moving through each lenticular lens unit L0 to L9 toward the observing position satisfy the area of the observing position. The linear images that are divided parallel-projection images with larger parallax angles are recorded sequentially to divisional recording units in the area where the observing and recording area and the recording area within the lens width R0 of the lenticular lens unit disposed in the immediate vicinity overlap with each other.

For example, a parallax image Z4 on the left side and a parallax image F5 on the right side are added to the linear images consisting of five parallax images of each lenticular lens unit L4 and L5 in the center respectively.

The linear images Z1, Y1 and X1, the divided parallel-projection images with parallax angles larger than that of linear image A1 are recorded sequentially to a divisional recording unit of an area where the observing and recording area D2 and the recording area within the lens width of the lenticular lens unit L0 disposed on the immediate left of the observing and recording area D2 overlap with each other in the linear image recording unit 2M1.

Similarly, the linear images F8, G8 and H8, the divided parallel-projection image with parallax angles larger than that of linear image E8 are recorded sequentially to the back side of the lenticular lens unit L9 disposed on the immediate right in the linear image recording unit 2M8.

By disposing the recording units as described above, it is possible to prevent observation of the information of the linear image recording unit and the lenticular lens unit in the immediate vicinity, thereby preventing image flicker and overlapping and in addition, light beam information can be obtained precisely from the linear image recording units 2M0 and 2M9, which are the edges of the sheet.

Meanwhile, some linear images produced and contained in the parallel-projection images such as linear images C0 and C9, for example, may not be recorded in the three-dimensional printed material 2 in Example 2.

As described above, the linear image recording units (2M1, etc.) are disposed in the observing and recording area (D2, etc.) which accord with the area of the observing position in the three-dimensional printed material 2 of Example 2, and the linear images (Z1, Y1 and X1, etc.) of the divided parallel-projection images with larger parallax angles are recorded sequentially to divisional recording units in the area where the observing and recording area and the recording area within a lens width (R0, etc.) of the lenticular lens unit (L0, etc.) disposed next to the observing and recording area overlap with each other.

This enables the three-dimensional information to be expressed more truly and the recorded material O to be expressed more naturally even when the recording units on the back of the lenticular lens units in the immediate vicinity of each linear image recording unit L1 to L8 are also observed.

Example 3

Next, Example 3 of a three-dimensional printed material (three-dimensional image recording medium) according to the present invention will be described.

The directional images are divided and used as linear images in the three-dimensional printed material of Example 3 instead of using the divided parallel-projection images as linear images as in Examples 1 and 2.

The directional images will be explained below.

FIGS. 8A, 8B, and 8C show a method for producing directional images from the front side of a recorded material O, which corresponds to the image from the direction C as shown in FIG. 5, FIG. 8A shows a plan view (top view) of the recorded material O, FIG. 8B shows the recorded material O from the left side and FIG. 8C shows a produced directional image.

A directional image is a two-dimensional image of the recorded material O parallel projected in the direction of projection plane (predetermined direction) in the plan view as shown in FIG. 8A. In contrast, the image of the side view of the recorded material O is perspective-projected to the projection plane focusing to the center of projection as shown in FIG. 8B. Consequently, the length in the vertical direction of the produced directional image comes close to the length actually observed while the length in the width direction (refer to length "d") is maintained as shown in FIG. 8C.

FIGS. 9A, 9B, and 9C show an example in which a directional image of the recorded material O having a parallax angle of approximately 45 degrees relative to the front direction, which corresponds to the image from the direction J as shown in FIG. 5, is produced by a similar method.

The directional image produced as above is an image having perspective in a vertical direction.

As described above, the three-dimensional printed material of Example 3 uses divided directional images as linear images and further provides a three-dimensional image by combining these linear images to thereby allow the recorded material O to be reproduced in three dimensions.

(Example of Shape Variation)

The shapes and modifications thereof are not limited to the Examples described above and various shapes and modifications are possible, and these are equally within the scope of the present invention.

(1) Examples in which the parallax images of a recorded material are only in one direction (horizontal direction) are described in Examples; however, the present invention is not limited to the above Examples. The parallax images of a recorded material may be in plural directions, or may be in two directions with the vertical direction added to the horizontal direction. This allows more detailed light beam information of the recorded material to be recorded and reproduced. In this case, a set of lenses in which many lenses are arranged flatly, a lens array or a so-called "fly's eye lens" may be used.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention. Accordingly, the invention is not to be considered to be limited by the foregoing description and is only limited by the scope of the appended claims.

What is claimed is:

1. A three-dimensional image recording medium, comprising:
   a lenticular sheet and a plurality of lenticular lens units arranged in the lenticular sheet; and
   a linear image recording medium comprising a plurality of linear image recording units being positioned, respectively, on a back side of each of the lenticular lens units;
   each of the linear recording units comprising a plurality of divisional recording units; and
   a plurality of projection images of an object recorded sequentially onto respective ones of the divisional recording units,
   wherein each of the plurality of projection images is an image of the object viewed from a different direction and wherein each of said projection images is divided into rectangular subsections of the image;
   wherein said rectangular subsections of respective ones of the images are recorded sequentially onto each of the divisional recording units as linear images, arranged in an identical position relative to a lens width direction of each of the lenticular lens units;
   wherein said projection images are projection images of plural directional images from the different directions,
   wherein the images recorded in the recording medium are combined at an observing position to obtain a three-directional image, wherein and
   the directional image is an image parallel projected in the lens width direction and perspective projected in a direction perpendicular to the lens width direction.

* * * * *